United States Patent [19]
Nagaraj et al.

[11] Patent Number: 6,112,129
[45] Date of Patent: *Aug. 29, 2000

[54] MOTHERBOARD SOLUTION FOR WAVE TABLE UPGRADE

[75] Inventors: Ravi Nagaraj, Hillsboro; Jesse Treger, Portland, both of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,429

[22] Filed: Nov. 26, 1997

Related U.S. Application Data

[62] Division of application No. 08/493,406, Jun. 22, 1995, abandoned.

[51] Int. Cl.$^7$ ..................................................... G06F 17/00
[52] U.S. Cl. .............................................................. 700/94
[58] Field of Search ...................... 364/400.01; 381/61, 381/63, 119; 84/600, 625, 603; 700/94; 369/4

[56] References Cited

U.S. PATENT DOCUMENTS 5,360,349 11/1994 Provencher et al. .
5,370,556 12/1994 Olsson .

*Primary Examiner*—Vivian Chang
*Attorney, Agent, or Firm*—Blakely, Sokoloff, Taylor & Zafman LLP

[57] ABSTRACT

A method and apparatus for providing a wave-table upgrade card to a baseboard having integrated audio card capabilities. The baseboard with the integrated audio features is provided with a connector with a predetermined header that is adapted to be coupled to a wave-table upgrade card through a plurality of data conductors. The wave-table upgrade card is provided with a connector having the same predetermined header as the connector on the baseboard. The predetermined header for the connectors and the data conductors includes a MIDI_Out pin, a Wave_Right pin, a Wave_Left pin, a MIDI_In pin, at least one ground pin, and a physical key that prevents improper insertion of the data conductors into the connectors on the wave-table card and baseboard.

17 Claims, 6 Drawing Sheets

MOTHERBOARD SOLUTION FOR WAVE TABLE UPGRADE

This is divisional of application Ser. No. 08/493,406, filed Jun. 22, 1995, now abandoned.

BACKGROUND OF THE INVENTION

1. Field of the Invention

The present invention relates generally to the field of wave-table upgrade cards. More particularly, the present invention relates to the provision of a wave-table upgrade card for a baseboard having integrated audio capabilities and features.

2. Description of the Related Art

A computer system typically provides audio capabilities and features to the system through an add-in card that is separate and distinct from the baseboard/motherboard of the computer system. For example, an audio card that provides sound capabilities to a computer system is typically coupled to the computer system through a system bus. The audio card receives data signals, control signals, and power supply voltages through the system bus.

Audio cards/circuits are well-known in the computer industry and typically include circuitry to perform the following functions: 1) Analog to Digital (A to D) and Digital to Analog (D to A) conversion of sound; 2) FM (frequency modulation) synthesis; 3) a MIDI (Musical Instrument Digital Interface protocol) and joystick interface; 4) decoding data from the system bus; and 5) mixer functions (i.e., mixing a number of sounds from different sources).

Initially, sound capabilities and features in a computer system were based entirely on FM synthesis. This technology generates different sounds by modulating sine waves. This technique is truly a "synthesis" in that one begins without any pre-recorded sounds. The starting point of FM synthesis is the selection of a single sine wave of a predetermined frequency (i.e., a pure tone). The sine wave at the preselected frequency produces a pure tone. One then uses another sine wave at a higher frequency to modulate the pure-tone sine wave. By so doing, a number of different notes and sounds may be created.

As technology for the digital sampling of sounds improved, the creation of sound through wave-table synthesis emerged as a technique for producing more true-to-life sounds. This wave-table technology is based on sampling different instruments and/or notes and storing these digitally sampled sounds into a memory. By using these stored sounds as a "library" of sounds, a dedicated signal processor is used to extrapolate and create any sound or note of an instrument from this library. This "library" of reference sounds enables the wave-table technology to produce more true-to-life sounds. Thus, when sound quality is important to an application, game, or multimedia presentation, wave-table technology is preferred over FM synthesis.

When this wave-table technology was initially implemented in a computer system, it was in the form of a stand-alone wave-table card. The card is coupled to the computer system through a system bus having a protocol such as ISA (Industry Standard Architecture). The card, which plugs into an ISA slot, would decode address, data and control signals from the ISA bus, reading and writing data from the bus. The card would also provide wave-table features and capabilities to the computer system would send the wave-table-synthesized audio to a jack in the back panel.

It is important to note that the wave-table upgrade card does not provide any of the audio features mentioned previously. Typically, these audio features were provided by a separate audio card that was coupled to another ISA slot.

There are four major disadvantages with implementing a wave-table card in a computer system by directly coupling the card to the system bus. First, since the wave-table card requires a capability to decode information from the ISA bus, additional circuitry is necessary to provide the necessary bus decoder logic. This logic increases the complexity and size (i.e., number of chips on the card) of the wave-table card. As card size and complexity increases, the cost to manufacture and produce the card increases proportionally.

Moreover, in this implementation the output of a wave-table card is separate and distinct from the output of the audio card. Thus, if a user of a computer system wanted to switch from an FM synthesis to a wave-table sound synthesis, the computer user would be required to physically reconfigure and reconnect speaker cables from one set of outputs to the other. This switching of speaker cables from the audio output jacks to the wave-table output jacks was very inconvenient and thus, a non-optimal solution.

In a second implementation of a wave-table card upgrade, the wave-table upgrade card is not directly coupled to the computer system through an ISA slot. Instead, the wave-table upgrade card is physically bolted and electrically coupled to a standard audio card. In other words, the wave-table card upgrade "piggy backs" on the standard audio card.

The audio card itself is physically and electrically coupled to the computer system through a bus slot of the ISA bus. The audio car d provides circuitry to decode information from the bus. Thus, the wave-table card is simplified because the wave-table card need not provide any bus decoder logic. Furthermore, the wave-table card used in this implementation is more cost efficient than the card in the first implementation. This implementation also saves an ISA slot since only one ISA slot is required in this implementation as compared to two ISA slots in the first implementation. This second implementation also obviates the manual switching of speaker cables from audio to wave-table outputs by providing an internal electric switching mechanism.

However, this second implementation still has several disadvantages. First, since the wave-table upgrade card is physically bolted to the audio card at specified mounting locations on the audio card, a wave-table upgrade card has to be of a predetermined/fixed size. Even if a manufacturer of a wave-table upgrade card could minimize logic and/or circuitry on the upgrade card, the actual fiberglass used must be a predetermined and fixed size since these dimensions are required to enable a physical coupling to the standard audio card. Second, the connector used to electrically couple the wave-table upgrade card to the standard audio card requires a high pin count, because all power and ground requirements must be supplied through the connector. These two factors, the fixed size of a wave-table upgrade card and the high pin count on the connectors, lead to an increase in the cost to manufacture the wave-table upgrade card and an increase in the cost of the connectors used to physically couple the audio card to the wave-table upgrade card.

In the two implementations discussed up to this point, an audio card that is separate and distinct from the baseboard provides the audio features of the computer system. When one integrates the audio features into a baseboard, the second implementation of a wave-table upgrade to an audio card is not possible because space constraints on the baseboard preclude mounting a wave-table card directly to the baseboard (i.e., a wave-table upgrade card cannot physically "piggy back" onto the motherboard).

Thus, a cost-efficient solution method and apparatus for providing a wave-table upgrade card to a baseboard with integrated audio capabilities is desirable.

SUMMARY OF THE INVENTION

A method and apparatus for providing a wave-table upgrade card to a baseboard having integrated audio card capabilities is described. The present invention provides: a) a motherboard with integrated audio/sound features and capabilities; b) a connector on the baseboard/motherboard with a predetermined header for coupling the wave-table upgrade card to the motherboard with the integrated audio features; and c) a wave-table upgrade card having a connector that is adapted to receive and transmit signals to and from the motherboard with the integrated audio capabilities.

First, the present invention provides a baseboard having integrated audio card capabilities and features. An audio block is integrated into the motherboard so that the motherboard alone can support audio/sound capabilities without a separate audio card. The audio block includes an FM synthesizer for converting MIDI information to sound. The audio block also provides an interface for MIDI and joystick functions. Third, the audio block provides for the mixing of sounds from a number of different sources. Last, the audio block provides circuitry to decode cycles of information and control signals from the ISA bus.

This motherboard with built-in audio features and capabilities provides cost and space savings. Instead of a separate audio card for providing the above-mentioned capabilities, several logic circuits are added directly to the motherboard. This implementation of audio features on a baseboard minimizes the amount of logic necessary to support sound capabilities, conserves the amount of space occupied by the audio circuitry, and reduces the cost of manufacturing a computer system with audio capabilities.

Moreover, the baseboard with the integrated audio features includes a male connector with a predetermined pin assignment that is adapted to be coupled to a wave-table upgrade card. A ribbon cable having two female ends with the predetermined pin assignment is used to couple the baseboard with integrated audio features to the wave-table upgrade card. The wave-table upgrade card includes a male connector having the same predetermined pin assignment, adapted to receive the female end of the ribbon cable.

The wave-table card (i.e., also known as a printed circuit board (PCB)) is coupled to a system bus slot for both mechanical support and for power supply requirements (i.e., power and ground signals). The ribbon cable that directly connects the motherboard to the wave-table PCB conveys MIDI imformation to the wave-table PCB from the motherboard, and stereo sound in a form of Wave-Right and Wave-Left back to the motherboard from the wave-table PCB.

The motherboard transmits a MIDI_Out signal to the wave-table upgrade card. The wave-table upgrade card returns two signals, Wave_Right and Wave_Left. Both of these wave signals are analog signals that are transmitted from the wave-table upgrade card to the motherboard with the integrated audio features. In the event of an error in the MIDI_Out signal, the wave-table upgrade card may transmit a MIDI_In signal to the motherboard to notify it of this error.

Other objects, features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth an embodiment or embodiments in accordance with the present invention for a method and apparatus for providing a wave-table card upgrade to a motherboard having integrated audio features and capabilities. In the following description, details are set forth such as specific connector header configurations, specific interconnections using a specific type of input/output bus, etc., in order to provide a thorough understanding of the present invention. It will be evident, however, that the present invention may be practiced without these details. In other instances, the functioning of well-known circuit components, logic blocks, FM synthesizers, digital to analog converters (DACs), digital signal processors etc., have not been described in particular detail, so as not to obscure the present invention.

Figure 1:
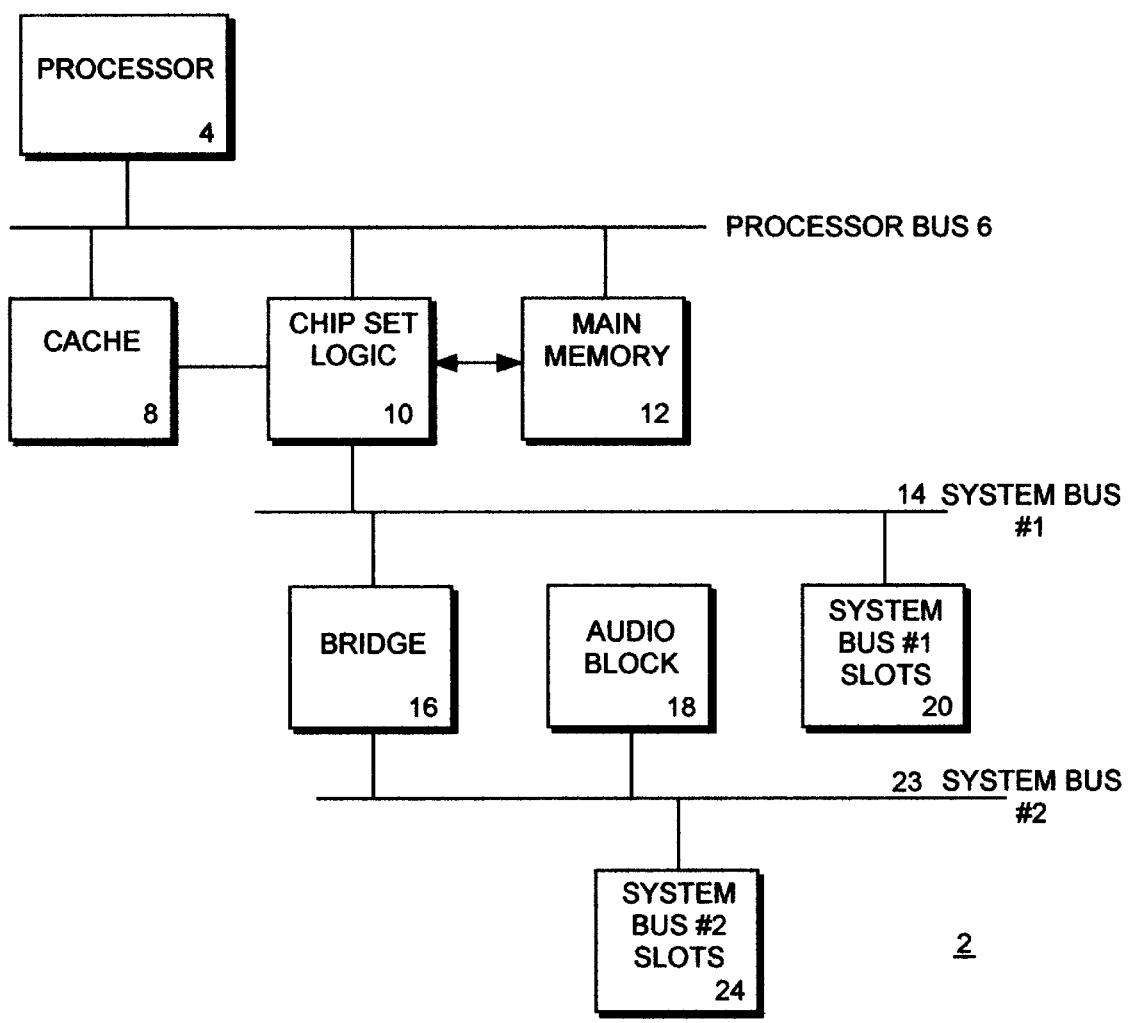
FIG. 1 illustrates a block diagram of a typical computer system incorporating the present invention.

FIG. 1 illustrates a computer system 2 having a processor 4 coupled to a cache memory 8, chip set logic 10 and memory 12 through a processor bus 6. The chip set logic 10 provides the interface between processor bus 6 and a system input/output (I/O) bus 14 having a first predetermined bus protocol (e.g., (PCI) Peripheral Components Interconnect). System bus 14 has a number of bus slots 20 that are adapted to receive add-in cards that enhance the processing capabilities of the computer system 2. These add-in cards, commonly referred to as printed circuit boards (PCBs), are physically mounted into these slots 20 which provide both the physical support and the electrical coupling between a card and the computer system 2. System bus 14 may be connected to a second system bus 23 having a second predetermined bus protocol 23 (e.g., (ISA) Industry Standard Architecture) through a bridge 16. The bridge is an interface between the first system bus having a first predetermined protocol and a second system bus having a second predetermined protocol.

In one embodiment, the second input/output bus 23 is an ISA bus. The second input/output bus also includes a plurality of I/O bus slots 24. These bus slots 24 are adapted to receive additional printed circuit boards (PCB) (e.g., add-in cards) and to couple these PCBs to the computer system 2. These cards are specifically configured to communicate to the computer system 2 through the system bus 23, which has a specified protocol, and to provide additional features and capabilities to the computer system 2.

Audio block 18 provides audio features and capabilities that the prior art provided by a separate audio card, which is coupled to one of the I/O bus slots 20, 24. Thus, audio block 18 allows audio features and capabilities to be integrated in a baseboard or motherboard.

Figure 2:
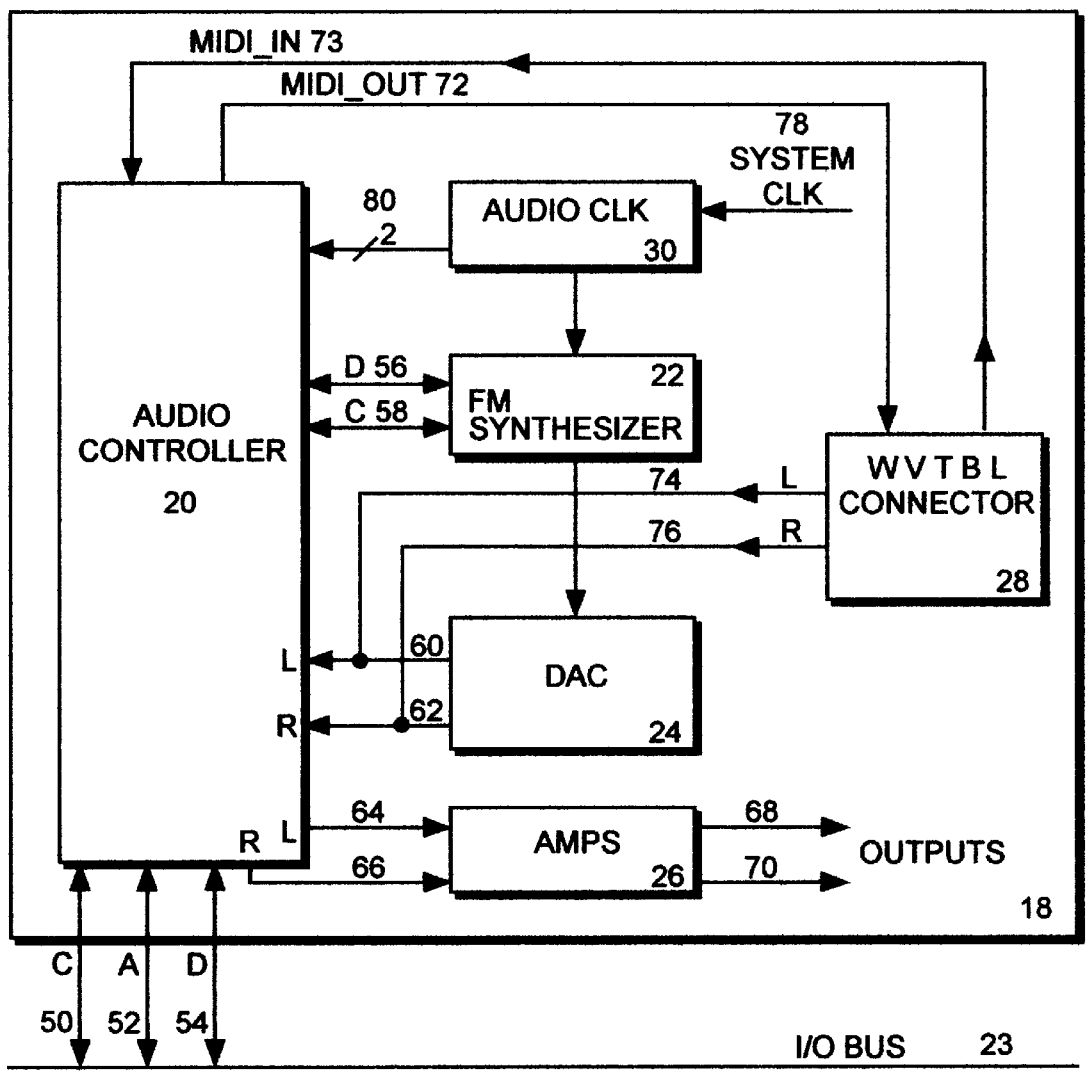
FIG. 2 illustrates, for one embodiment, a block level diagram for an audio block integrated into a motherboard.

FIG. 2 illustrates in greater detail a block diagram of audio block 18. Audio block 18 includes an audio controller 20 that is coupled to the I/O bus 23. The audio controller 20 sends and receives control signals 50, address 52 and data 54 signals to and from the I/O bus 23. The audio controller 20 decodes cycles of control signals 50, address information 52 and data information 54 from the I/O bus 23. The audio controller 20 also can read from and write to main memory 12 in the computer system 2.

The audio controller 20 also controls a FM synthesizer 22. Audio controller 20 communicates with FM synthesizer 22 with control signals 58 and data signals 56. For example, an audio controller 20 can write data to registers within FM synthesizer 22 to generate a particular sound or tone. FM synthesizer 22 is coupled to DAC 24, which is simply a digital-to-analog converter. The output of the FM synthesizer 22 is a plurality of bits that represents a sound in digital format. The DAC 24 converts this sound information in digital format into analog sound signals 60 and 62. These analog sound signals, FM_Left signal 60 and a FM_Right signal 62, represent stereo sound. Both of these analog stereo signals are passed back to the audio controller 20 for further operations (i.e., mixing). Audio controller 20 includes circuitry for mixing analog sounds from a number of different sources and for choosing a composite sound for transmission out of the computer system (e.g., into speakers).

Once the desired sound processing (e.g., mixing) is complete, audio controller 20 sends an Audio_Left signal 64 and an Audio_Right signal 66 to an amplifier 26. After the requisite amplification, amplifier block 26 sends amplified Audio_Left and Audio_Right signals 68, 70 are outputs to speakers or further amplification blocks.

Audio controller 20 also sends a MIDI_Out signal 72 to wave-table upgrade connector 28. This connector 28, which provides a predetermined header, is adapted to be coupled through a plurality of data conductors to a corresponding connector, disposed on the wave-table upgrade card (not shown). In one embodiment, the data conductors nay be in the form of a ribbon cable having female connectors at each end, and the baseboard and wave-table card each include a male connector adapted to receive a female end of the cable. After the wave-table upgrade card processes the MIDI_Out signal 72, it returns a Wave_Left 74 signal and a Wave_Right 76 signal back through connector 28 into audio controller 20. These signals 74 and 76 are analog sound signals which may further be mixed and also sent outside of the computer system through amplifier block 26. Thus, audio controller 20 is provided analog sound signals 60,62 from the FM synthesizer 22 through DAC 24 and analog sound signals 74, 76 from the wave-table card through wave-table connector 28.

An audio clock 30 receives a system clock 78 and generates a number of clock signals at several predetermined frequencies that are necessary for the proper operation of audio controller 20 and FM synthesizer 22. The audio clock 30 provides these clock signals to FM synthesizer 22. FM synthesizer 22 uses these clock signals to generate different tones and sounds. Audio clock 30 also sends clock signals of predetermined frequencies to audio controller 20 for the control and operation of the audio block 18.

Figure 3:
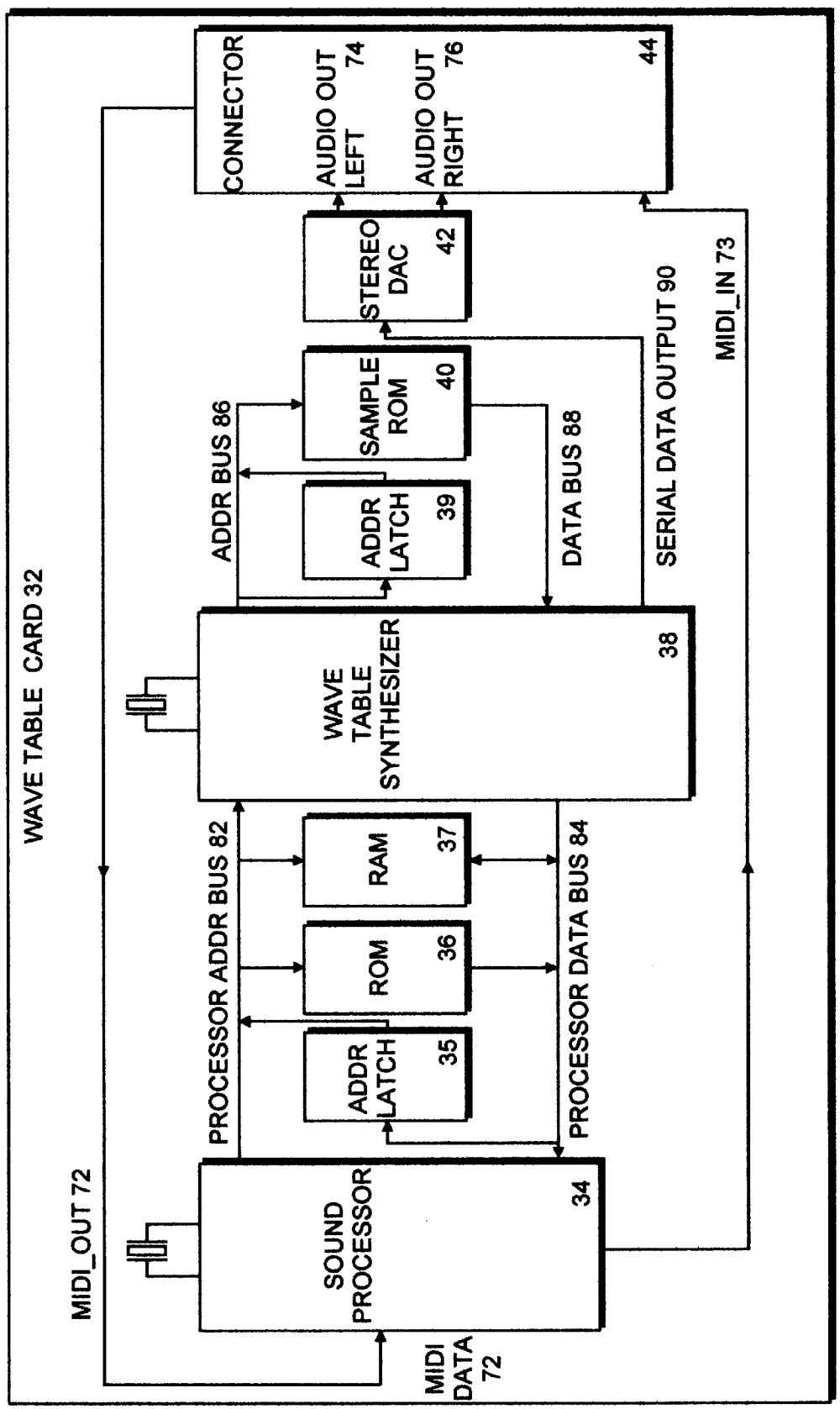
FIG. 3 illustrates, for one embodiment, a block level diagram for a wave-table upgrade card.

FIG. 3 illustrates a block diagram of a wave-table card 32 having a connector 44 that is adapted to be coupled to a motherboard with integrated audio features through a plurality of data conductors (i.e., a ribbon cable or wire).

MIDI information in the form of MIDI_Out 72 is sent through connector 44 into a microprocessor 34. The microprocessor 34 is coupled to a wave-table synthesizer 38 through an address bus 82 and a data bus 84. Both the microprocessor 34 and the wave-table synthesizer 38 are coupled to an address latch 35, ROM (read only memory) 36 and RAM (random access memory) 37.

The microprocessor 34 acts as a wave-table sub-system controller. The microprocessor 34 receives a MIDI_Out signal 72 from the motherboard with the integrated audio capabilities, interprets these signals, and then writes to the RAM 37. The data information written to the RAM 37 is used in conjunction with sampled sounds 40 and a wave-table synthesizer 38 to generate a desired sound.

ROM memory 36 includes tables that store characteristics for each instrument to be reproduced. The tables identify a number of parameters such as memory locations where the samples are stored, characteristics of digital filters to be used, characteristics of the envelope of the signal, the mixing levels and the default output levels for each note of each instrument. When the microprocessor 34 receives a MIDI_Out signal 72, it reads the parameter data for a desired note from ROM 36, and then writes the appropriate values into AM 37. The wave-table synthesizer logic 38 then generates the desired sound by using those values stored in the RAM 37.

Wave-table synthesizer logic 38 is coupled to sample ROM 40 through address bus 86 and data bus 88. The wave-table synthesizer 38 is further coupled to address latch 39. The wave-table synthesizer 38 logic sends an address to address latch 39 which transfers the address back on to address bus 86 and into sample ROM 40. Sample ROM 40 includes many sounds, which are digitally sampled from actual instruments. These samples are used by the wave-table synthesizer logic 38 to generate melodic timbers and variations and drum sounds. Certain instruments that are considered "critical" are over-sampled and stored in sample ROM 40. To provide high fidelity and realistic sounds, sound processing techniques such as velocity-controlled polyphonic digital filtering and amplitude envelope compression is applied to certain instrument sounds in ROM 40.

The digital audio output 90 of the synthesizer 38 is routed to a digital-to-analog converter (DAC) 42. DAC 42 is coupled to connector 44 and transmits a Wave_Left signal 74 and a Wave_Right signal 76 to the motherboard with the integrated audio features. Thus, a wave-table card 32 has been illustrated through FIG. 3.

Figure 4:
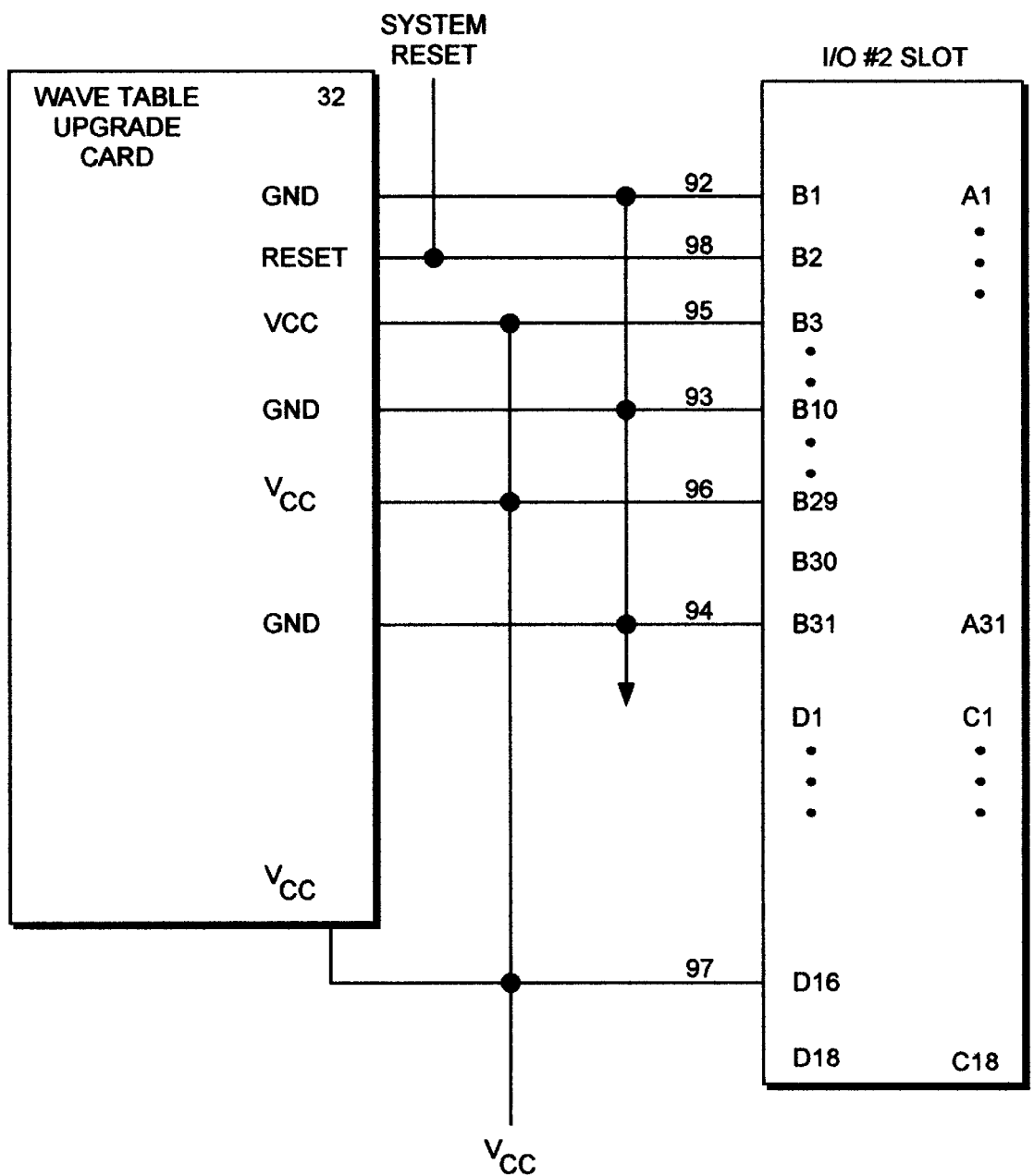
FIG. 4 illustrates, for one embodiment, the electrical coupling between a wave-table upgrade card and a system bus slot.

FIG. 4 illustrates how the wave-table upgrade card 32, which includes a connector with a predetermined header, electrically couples to an input/output bus slot 24 that is located on the motherboard. The input/output slot 24, provides both the physical support and the power voltage and ground requirements of the wave-table upgrade card 32. Although in this particular embodiment, input/output slot 24 is an ISA bus slot, one skilled in the art would understand that the teachings of the present invention are equally applicable to buses having a different protocol.

Wave-table upgrade card 32 receives three ground signals 92, 93, 94 from pins B1, B10, and B31 on the ISA bus slot 24. The wave-table upgrade card 32 also receives two power voltage signals 95 and 96 from pins B3 and B29 of the ISA bus slot. Each of these power voltage signals 95 and 96 represent $V_{cc}$ and provide power to the wave-table upgrade card 32. In addition to these power voltage signals, the input/output slot 24 also provides a system reset signal 98 from pin B2 to wave-table upgrade card 32. This system reset signal 98 initializes the wave-table upgrade card 32 upon system start-up and/or re-initialization of the computer system.

Although many more pins are available on the system bus slot 24, the present invention minimizes the number of pins used, so that only seven pins are required for the proper operation of the wave-table upgrade card 32. The present invention greatly reduces the number of electrical connections necessary between the wave-table upgrade card 32 and the ISA slot 24 as compared with the wave-table upgrade card that does not "piggy-back" on an audio card (i.e., stand alone implementation). The savings in the number of pins, may be attributed to the fact that the wave-table card 32 receives all sound information directly through data conductors, which are coupled to the motherboard with integrated audio features. Thus, the wave-table upgrade card 32 does not require any additional sound information from the ISA slot 24. Moreover, since all decoding of sound information is processed by the audio block 18 on the integrated motherboard, the wave-table upgrade card's 32 logic may be vastly simplified because the decoder logic, previously necessary to decode information from the system bus, is made unnecessary by the present invention.

Figure 5:
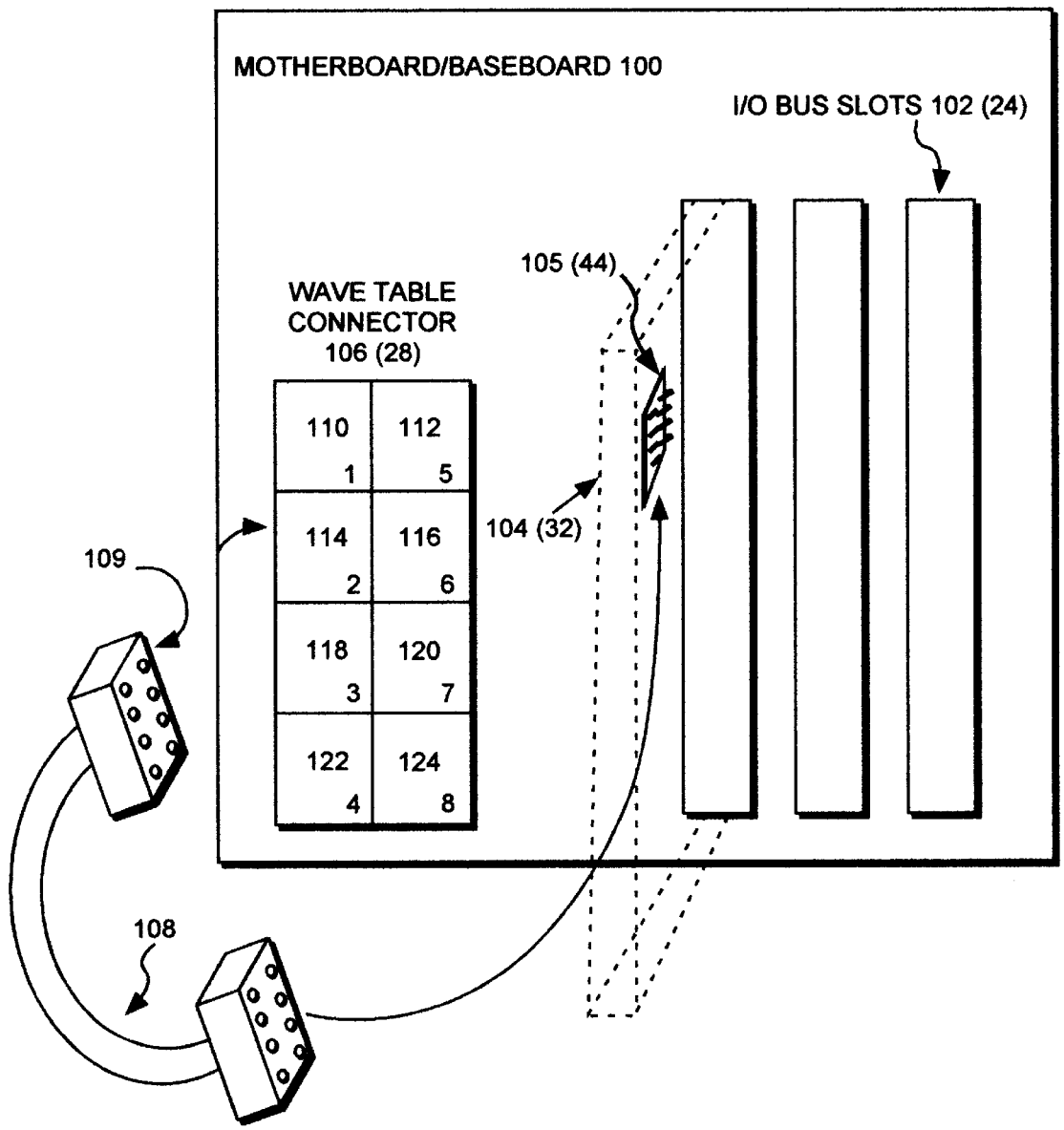
FIG. 5 illustrates how one embodiment of the present invention is physically configured in a computer system.

FIG. 5 illustrates the layout of a motherboard 100, the placement of input/output bus slots 102 (referred to previously in FIG. 1 as element 24), and the wave-table connector 106 (referred to as element 28 in FIG. 2). FIG. 5 also illustrates how the motherboard 100 with the integrated audio features is electrically coupled to a connector 105 (referred to previously as element 44 in FIG. 3) of the wave-table upgrade card 104 (referred to previously in FIG. 3 and 4 as element 32) through a plurality of data conductors in the form of a ribbon cable 108. The wave-table upgrade card 104 is physically coupled to the motherboard 100 through an input/output bus slot 102. The motherboard, also referred to as a baseboard 100, includes the audio block described in FIGS. 1 and 2 (not shown in this figure) and a number of input/output bus slots 102. In this particular embodiment, as mentioned previously, these input/output bus slots 102 are ISA slots 102. The motherboard/baseboard 100 also includes a wave-table connector 106 (previously referred to as connector 28 in FIG. 2). Wave-table connector 106 has a two-by-four pin header with the predetermined signal definitions shown in Table I.

TABLE I

| Pin Number | Reference Number | Signal Name |
| --- | --- | --- |
| Pin 1 | 110 | Wave_Right signal |
| Pin 2 | 114 | Wave_Left signal |
| Pin 3 | 118 | physical key (to prevent improper insertion) |
| Pin 4 | 122 | MIDI_In signal |
| Pin 5 | 112 | ground signal |
| Pin 6 | 116 | ground signal |
| Pin 7 | 120 | ground signal |
| Pin 8 | 124 | MIDI_Out signal |

Figure 6:
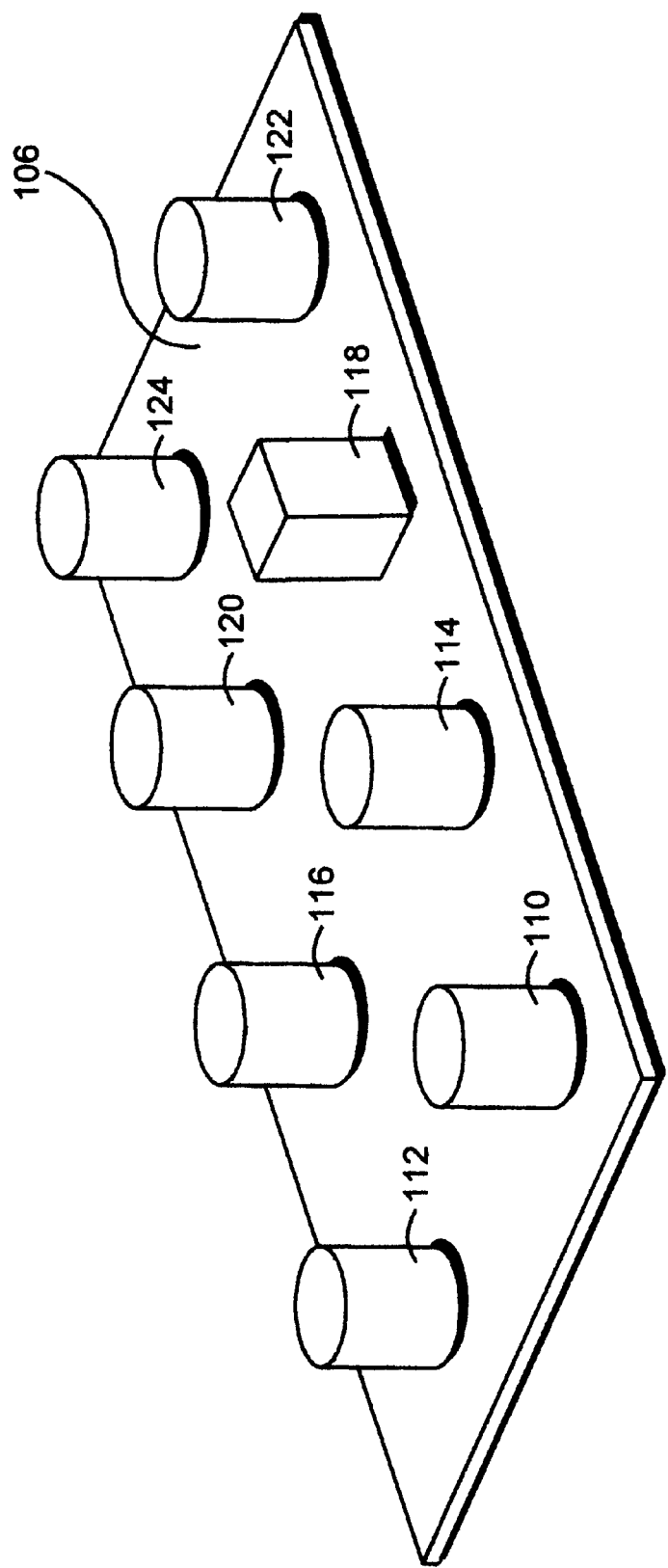
FIG. 6 illustrates one embodiment of a connector

In this particular embodiment, illustrated in FIG. 6, the wave-table connector 106 is a two-by-four 0.1 inch pitch header. A connector with a 0.1 inch pitch header requires that each pin on the connector be 0.1 inch apart. Pin 3 is a physical key that precludes the accepting/receiving of a data conductor (i.e., wire). The physical key 118 prevents improper insertion of data conductors into the connector by allowing only one specific physical coupling between the connector and the data conductors. The other pins 110, 112, 114, 116, 120, 122, 124 all receive a respective data conductor.

Pin 1 110 on wave-table connector 106, representing Wave_Right signal is an analog signal received from wave-table upgrade card and corresponds to the Wave_Right signal 76 of FIG. 2. Similarly, Pin 2 114 of wave-table connector 106 receives the Wave_Left signal from the wave-table upgrade card 104. Pin 2 114 corresponds to the Wave_Left signal 74 of FIG. 2. The motherboard/baseboard 100 transmits the MIDI_Out signal through pin 8, 124 to the wave-table upgrade card 104. In the event of an error in the MIDI_Out signal, the wave-table upgrade card 104 may transmit a MIDI_In signal to the motherboard/baseboard 100 through pin 4 122 to notify it of the error. In summary, a plurality of data conductors in the form of a cable 108 connects the motherboard/baseboard 100 to the wave-table 104. This ribbon cable 108 conveys MIDI information to the wave-table PCB from the motherboard 100 and stereo sound (in the form of Wave_Right and Wave_Left signals) back to the motherboard 100.

The present invention provides a simplified wave-table connector 106, disposed on the baseboard 100, having a predetermined header, as defined in Table I, and also a connector 105 on the wave-table upgrade card 104, having the same header. Both of these connectors are adapted to receive a plurality of data conductors, which may be in the form of a cable 108. The data conductors electrically couple the motherboard 100 with integrated audio features to the wave-table PCB 104. The present invention also greatly simplifies the logic necessary in a wave-table card 104. Because reading and writing sound information to the input/output bus is managed by circuitry in the audio block that is integrated into the motherboard/baseboard 100, the wave-table PCB need not contain any logic for decoding data from the input/output bus. Moreover, since the present invention provides a wave-table PCB upgrade to a motherboard 100 with integrated audio features, a physical coupling of the wave-tabletable PCB 104 to an audio card which is separate and distinct from the motherboard 100, is not necessary. Wave-table PCB manufacturers are also free to reduce the size of the printed circuit board on which the wave-table upgrade card is implemented. In other words, a wave-table PCB manufacturer is no longer constrained by size requirements that were dictated by the fixed mounting locations on the audio card that effectively precluded manufacturers from making a wave-table upgrade card smaller than the area, defined by the mounting locations on the audio card. Thus, the present invention provides an elegant, cost-effective method and apparatus for providing a wave-table upgrade card to a motherboard with integrated sound capabilities.

It will be recognized that the above-described invention may be embodied in other specific forms without departing from the spirit or the essential characteristics of the invention. For example, although the above-mentioned embodiments are described with respect to an ISA bus, it would be understood by one skilled in the art that alternative embodiments of the present invention may be implemented on input/output buses of different protocols. In addition, alternative embodiments of the present invention may connect the motherboard with the integrated audio features to the wave-table upgrade PCB by other means other than a ribbon cable as described. Any means that can electrically couple the motherboard to the wave-table upgrade card may be used. Thus, while certain exemplary embodiments have been described and shown in the accompanied drawings, it is to be understood that the invention is not limited by the foregoing illustrative details, but rather is defined by the appended claims.

What is claimed is:

1. A computer system comprising:

a baseboard having an input/output bus, an input/output bus slot, and an integrated audio block coupled to the input/output bus, said integrated audio block comprising (i) FM sound synthesis logic, (ii) audio support logic to support a wave-table audio upgrade, (iii) an upgrade port, and (iv) logic to process sound related bus transactions;

a printed circuit board to couple to the input/output bus slot for power and ground support for components dispensed on the printed circuit board, said components including a wave-table audio upgrade block, said wave-table audio upgrade block comprising an audio port; and an audio connector to couple the upgrade port of the integrated audio block of the baseboard with the audio port of the wave-table audio upgrade block of the printed circuit board, said audio connector to facilitate transfer of commands for sound information sent from the integrated audio block to the wave-table audio upgrade block responsive to the sound related bus transactions being processed by the integrated audio block, and to transfer the corresponding sound information back from the wave-table audio upgrade block to the integrated audio block to upgrade sound capabilities of the integrated audio block.

2. The computer system as set forth in claim 1 wherein the upgrade port comprises a first predetermined header, said first predetermined header to receive a first end of the audio connector; and wherein the audio port comprises a second predetermined header, said second predetermined header to receive a second end of the audio connector.

3. The computer system as set forth in claim 2 wherein the each of the first and second predetermined headers include a pin for transmitting a Wave_signal, a pin for transmitting a Wave_signal, at least one ground pin, a physical key to prevent improper insertion of the audio connector, a pin for transmitting a MIDI_Out signal and a pin for transmitting a MIDI_In signal.

4. The computer system as set forth in claim 1, wherein the audio connector includes a plurality of conductors.

5. The computer system as set forth in claim 1, wherein the audio connector includes a cable having a plurality of conductors.

6. The computer system as set forth in claim 1 wherein the audio connector comprises a cable having a plurality of data conductors to electrically couple the baseboard to the printed circuit board, said cable having a predetermined header, said header comprising:

a conductor for transferring a Wave_signal;
a conductor for transferring a Wave_Left signal;
at least one ground conductor;
a conductor for transferring a MIDI-Out signal;
a conductor for transferring a MIDI_In signal; and
a physical key.

7. The computer system as set forth in claim 1 wherein the integrated audio block transmits to the wave-table audio upgrade block through the audio connector a digital sound signal and the wave-table audio upgrade block transmits in response to the digital sound signal at least one analog sound signal.

8. A baseboard comprising:
an audio block integrated into said baseboard;
an input/output (I/O) bus slot to couple with a header of a printed circuit board, said printed circuit board comprising a wave-table audio upgrade, said I/O bus slot to provide power and ground requirements to the wave-table audio upgrade of the printed circuit board; and an upgrade port, said upgrade port to physically and electrically couple the audio block with the wave-table audio upgrade of the printed circuit board, said upgrade port adapted to facilitate transfer of commands for sound information sent from the audio block to the wave-table audio upgrade responsive to sound related bus transactions being processed by the audio block and to transfer the corresponding sound information back from the wave-table audio upgrade to the audio block to upgrade sound capabilities of the audio block.

9. The baseboard of claim 8 wherein the upgrade port comprises a predefined header, wherein said predefined header includes a pin for transmitting a Wave_signal, a pin for transmitting a Wave_Left signal, at least one ground pin, a physical key to prevent improper insertion of a transferring means into the connector, a pin for transmitting a MIDI_ signal and a pin for transmitting a MIDI_In signal.

10. The baseboard of claim 8 wherein the audio block comprises:
a frequency modulation (FM) sound synthesizer; and
a wave-table audio upgrade interface.

11. The baseboard of claim 8 wherein the I/O bus slot comprises: an industry standard architecture (ISA) port.

12. The baseboard of claim 8 wherein the upgrade port is to couple with a ribbon cable, said ribbon cable to couple the upgrade port of the baseboard to an audio port of the printed circuit board.

13. A printed circuit board comprising:
a wave-table audio upgrade;
a header to couple with an input/output (I/O) bus slot of a baseboard, said baseboard comprising an integrated audio block, said I/O bus slot to provide power and ground requirements for the wave-table audio upgrade; and an audio port, said audio port to electrically and physically couple the wave-table audio upgrade to the integrated audio block, said audio port adapted to facilitate transfer of commands for sound information sent from the integrated audio block to the wave-table audio upgrade responsive to sound related bus transactions being processed by the integrated audio block and to transfer the corresponding sound information back from the wave-table audio upgrade to the integrated audio block to upgrade sound capabilities of the integrated audio block.

14. The printed circuit board of claim 13 wherein the audio port comprises a predefined header, wherein said predefined header includes a pin for transmitting a Wave_Right signal, a pin for transmitting a Wave_Left signal, at least one ground pin, a physical key to prevent improper insertion of a transferring means into the connector, a pin for recieving a MIDI_Out signal, and a pin for transmitting a MIDI_signal.

15. The printed circuit board of claim 13 wherein the wave-table audio upgrade comprises:
a storage medium to store a plurality of sound samples; and
synthesizer logic to generate the sound information to provide to the integrated audio block based on the commands.

16. The printed circuit board of claim 13 wherein the header is an industry standard architecture (ISA) header.

17. The printed circuit board of claim 13 wherein the audio port is to couple with a ribbon cable, said ribbon cable to couple the audio port of the printed circuit board to an upgrade port of the baseboard.

* * * * *

UNITED STATES PATENT AND TRADEMARK OFFICE
CERTIFICATE OF CORRECTION

PATENT NO. : 6,112,129  Page 1 of 1
DATED : August 29, 2000
INVENTOR(S) : Nagaraj et al.

It is certified that error appears in the above-identified patent and that said Letters Patent is hereby corrected as shown below:

Column 2,
Line 30, delete "audio car d" and insert -- audio card --.
Line 64, delete "is not possible" and insert -- is not possible --.

Column 4,
Line 46, delete "protocol 23 (e.g." and insert -- protocol (e.g. --.

Column 9,
Line 33, delete "Wave_signal" and insert -- Wave_Right signal --.
Line 34, delete "Wave_signal" and insert -- Wave_Left signal --.
Line 48, delete "Wave_signal" and insert -- Wave_Right signal --.

Column 10,
Line 12, delete "Wave_signal" and insert -- Wave_Right signal --.
Line 51, delete "receiving" and insert -- receiving --.
Line 52, delete "MIDI_signal" and insert -- MIDI_In signal --.

Signed and Sealed this

Third Day of September, 2002

Attest:

JAMES E. ROGAN
Attesting Officer   Director of the United States Patent and Trademark Office